United States Patent
Brockmeyer

(10) Patent No.: US 11,926,546 B2
(45) Date of Patent: Mar. 12, 2024

(54) USE OF CONDUCTIVE PARTICLES SUSPENDED IN ELECTROLYTE TO ENHANCE BIODEGRADATION RATE

(71) Applicant: BIOVALENCY LLC, Glastonbury, CT (US)

(72) Inventor: Daniel Brockmeyer, Glastonbury, CT (US)

(*) Notice: Subject to any disclaimer, the term of this patent is extended or adjusted under 35 U.S.C. 154(b) by 0 days.

(21) Appl. No.: 18/251,238

(22) PCT Filed: Sep. 8, 2022

(86) PCT No.: PCT/US2022/042824
§ 371 (c)(1),
(2) Date: Apr. 30, 2023

(87) PCT Pub. No.: WO2023/039014
PCT Pub. Date: Mar. 16, 2023

(65) Prior Publication Data
US 2023/0322596 A1    Oct. 12, 2023

Related U.S. Application Data

(60) Provisional application No. 63/260,969, filed on Sep. 8, 2021.

(51) Int. Cl.
*C02F 3/00* (2023.01)
*C02F 3/30* (2023.01)

(52) U.S. Cl.
CPC ............. *C02F 3/005* (2013.01); *C02F 3/30* (2013.01); *C02F 2003/003* (2013.01); *C02F 2209/05* (2013.01)

(58) Field of Classification Search
CPC ...... C02F 3/005; C02F 3/30; C02F 2003/003; C02F 2209/05
See application file for complete search history.

(56) References Cited

U.S. PATENT DOCUMENTS 9,580,340 B1    2/2017 Cox, Jr.

OTHER PUBLICATIONS

Barba et al., Biostimulation versus bioaugmentation for the electro-bioremediation of dichlorophenoxyacetic acid polluted soils, Journal of Environmental Management, 7 Oct. 28-31, 2020, vol. 277.
Aulenta et al., An underappreciated DIET for anaerobic petroleum hydrocarbon-degrading microbial communities. Microbial Biotechnology, Jan. 2021, vol. 14, No. 1.
Wan et al., Remediation of a hexachlorobenzene-contaminated soil by surfactantenhanced electrokinetics coupled with microscale Pd/Fe PRB. Journal of Hazardous Materials, Dec. 15, 2010, vol. 184, No. 1-3.

*Primary Examiner* — Hayden Brewster
(74) *Attorney, Agent, or Firm* — Matthew J Patterson

(57) ABSTRACT

In some implementations, a method may include introducing into a contaminated media a suspension of a bioremediation composition. In addition, the method may include where the bioremediation composition may include a first bioremediation composition having a first blend of one or more electrolyte solutions capable of ionic conduction and a second bioremediation composition having a second blend of one or more active materials and being capable of electric conduction.

14 Claims, 4 Drawing Sheets

USE OF CONDUCTIVE PARTICLES SUSPENDED IN ELECTROLYTE TO ENHANCE BIODEGRADATION RATE

CROSS-REFERENCE TO RELATED APPLICATION

This application claims the benefit of Patent Cooperation Treaty Patent Application Serial No. PCT/US22/42824 filed 8 Sep. 2022 as well as U.S. Provisional Patent Application No. 63/260,969, filed on 8 Sep. 2021, both entitled "APPARATUS AND METHODS FOR THE USE OF CONDUCTIVE PARTICLES SUSPENDED IN ELECTROLYTE TO ENHANCE BIODEGRADATION RATE." The disclosure of the prior Applications are considered part of and are incorporated by reference into this Patent Application.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. The references cited and discussed in this specification are incorporated herein by reference in their entireties and to the same extent as if each reference was individually incorporated by reference. In terms of notation, hereinafter, "[n]" represents the nth reference cited in the reference list. For example, [1] represents the first reference cited in the reference list, namely, "Green Remediation Best Management Practices: Bioremediation" (2010).

BACKGROUND

The U.S. Environmental Protection Agency (EPA) describes bioremediation as a process that "actively enhances the effects of naturally occurring biological processes that degrade contamination in soil, sediment, and groundwater". The bioremediation process can operate in undisturbed contaminated media (in situ remediation) or the contaminated media may be transferred for treatment to an engineered system located above or below grade (ex situ remediation). Examples of in situ bioremediation systems of the prior art include the injection of amendments (biostimulation) and the introduction of non-native microorganisms (bioaugmentation) directly into the contaminated media. Examples of ex situ bioremediation systems include bioreactors (constructed above or below grade) and land-based systems that where the contaminated media is physically mixed with amendments. When the contaminated media is mixed above grade it is known as "land-farming" and if the mixing occurs below grade it is called "soil blending". [1] Amendments used in biostimulation or ex situ systems (e.g., oxygen or carbon-sources such as lactate) are introduced as a means of increasing the bioremediation rate (rate of biological degradation). [2] The selection of the amendments depends on the type of biologically catalyzed reactions desired (oxidation or reduction of contaminates) as well as the environment (aerobic or anerobic) of the system.

Bioremediation systems designed to target petroleum hydrocarbons can take advantage of biologically catalyzed oxidation reactions that can occur in aerobic or anaerobic environments. In an aerobic oxidation system, oxygen is introduced as the amendment through the introduction of air (bioventing) or peroxides (e.g., hydrogen peroxide, calcium peroxide), or the direct exposure of the contaminated media to air (landfarming and soil blending).

Examples of electron acceptors that can be used in anerobic oxidative bioreactors include sulfate, nitrate, manganese, ferric iron, and carbon dioxide. [3] Due to regulatory concerns surrounding the discharge of many of these substances, sulfate is the most common amendment used in in situ anerobic oxidation systems. The introduction of sulfate as an amendment relies on naturally occurring sulfate-reducing bacteria; the presence of which has been well documented at contaminated sites containing anerobic environments. [4]

Bioremediation systems designed to target halogenated volatile organic compounds (HVOCs) typically rely on biologically catalyzed reductive reactions. The amendments used in these systems serve as electron doners; therefore, these systems can only operate in reduced environments. Examples of amendments used in reductive dichlorination include carbon-rich substances (e.g., molasse, lactate, and organic-rich wastes) which are used by the microorganisms as a food source (i.e. lactate biologically oxidized to lactic acid).[5] The oxidation of the carbon-rich amendment creates a highly reducing environment where HVOCs may be used as electron acceptors.[6] Some microorganisms are capable of using HVOCs as an electron acceptor (e.g., tetrachloroethylene converted to trichloroethylene).

The removal of dissolved pollutants from water using activated carbon derived from biomass or biochar (e.g., coconut shell) is well established in the prior art.[7] Over time, these systems have evolved to use powdered activated carbon and more recently colloidal particles of carbon,[8] which provided greater surface area per unit mass and can be pumped and injected into the subsurface. These systems are currently being investigated for the treatment of groundwater polluted with per- and poly-fluorinated alkyl substances (PFAS).[9]

Bioremediation of heavy metal and other inorganic contamination originating from a geochemical or anthropogenic source is an emerging field.[10],[11] Since heavy metals are not biodegradable, these systems generally rely on altering the environment of the contaminated zone through the introduction of a carbon source (e.g., ethanol, acetate) to enhance the rate of metals reduction.[12] This allows for the controlled precipitation or mobilization of the heavy metals for recovery. This method has been shown to be effective in ex situ treatment systems designed for the removal of chromium (hexavalent to trivalent), nitrate, and sulfate from groundwater.[13]

All of the bioremediation systems of the prior art described above can also operate using microbial electrochemical methods where electrons are donated or accepted through solid electrodes (e.g., carbon, graphene, act.). These methods can be used to enhance the bioremediation rate of pollutants provided that the microorganisms present are capable of some form of extra-cellular electron transfer. Microbial electrochemical treatment systems are also able capable of treating heavy metals and inorganics through precipitation or mobilization by change in oxidation/reduction potential of the environment which allow for these pollutants to be recovered.[14]

What is needed is a method and compositions for in situ remediation of contaminated media and solves the short comings of the prior art.

SUMMARY

In one general aspect, a method may include introducing into a contaminated media a suspension of a bioremediation composition. The method may also include where the bioremediation composition may include a first bioremediation composition having a first blend of one or more electrolyte solutions capable of ionic conduction, and a second bioremediation composition having a second blend of one or more active materials and being capable of electric conduction. Where the terms electrolyte solution and active material are used in a manner consistent with the technology commonly described as a flow electrode.

Implementations may include one or more of the following features. The method may include where the contaminated media may include a first environment that is electrically connected to a second environment where an oxidation-reduction potential exists between the first environment and the second environment, and transferring a plurality of electrons between the first environment and the second environment using electric conduction and the ionic conduction. The method where the second blend of one or more active materials may include at least one or more electrically conductive particles. The method where the one or more electrically conductive particles is selected from the group consisting of graphene, carbon black, activated carbon, biochar, carbon nanotubes, magnetite, hematite, conductive polymers, amorphous and mesoporous silica, titanium dioxide, aluminum oxide, metal oxides coated with conductive material, and metal organic frameworks. The method where the contaminated media includes a plurality of naturally occurring microorganisms, and where the plurality of naturally occurring microorganisms are capable of forming a biofilm on a surface of one or more electrically conductive particles and where the conductive particles transfer a plurality of electrons between the first environment and the second environment by electric conduction. The method where the first environment may include an anerobic zone and the second environment may include an aerobic zone and where the plurality of electrons flow from the anerobic zone to the aerobic zone by electric conduction. The method may include converting the plurality of electrons into a plurality of reduced species of ions. The method where the plurality of reduced ions flow from the aerobic zone to the anerobic zone using ionic conduction. The method may include coupling an external electrical circuit between the first environment and the second environment, and applying an electrical current or an electrical load to the external electrical circuit. The method may include coupling an external electrical circuit between the first environment and the second environment, and monitoring a bioelectrical current using the external electrical circuit, and evaluating a bioremediation rate. The method where the contaminated media may include any of a soil, a sediment, a fill material, a groundwater, a surface water, and a waste water. The method where the first blend of one or more electrolyte solutions may include at least one electrolyte salt dissolved in an electrolyte solvent. The method where the first blend of one or more electrolyte solutions may include at least one electrolyte salt selected from the group consisting of manganese sulfate, calcium nitrate, calcium chloride, sodium acetate, iron-EDTA, biocompatible surfactants, natural minerals, or anthropogenic sources. The method where the bioremediation composition further may include a surfactant composition capable of increasing the dispersion of the one or more active materials into the bioremediation composition and increasing ionic conduction.

In one general aspect, a compound may include a first bioremediation composition having a first blend of one or more electrolyte solutions capable of ionic conduction. The compound may also include a second bioremediation composition having a second blend of one or more active materials and being capable of electric conduction.

Implementations may include one or more of the following features. The compound may include where the contaminated media of a first environment is electrically connected to a second environment where an oxidation-reduction potential exists between the first environment and the second environment, and where the compound is configured to transfer a plurality of electrons between the first environment and the second environment using the electric conduction and the ionic conduction. The compound where the second blend of one or more active materials may include at least one or more electrically conductive particles. The compound where the one or more electrically conductive particles is selected from the group having of graphene, carbon black, activated carbon, biochar, carbon nanotubes, magnetite, hematite, conductive polymers, amorphous and mesoporous silica, titanium dioxide, aluminum oxide, metal oxides coated with conductive material, and metal organic frameworks. The compound where the contaminated media includes a plurality of naturally occurring microorganisms, and where the one or more electrically conductive particles include a surface and are configured to form a biofilm on the surface with the plurality of naturally occurring microorganisms. The compound where the first environment may include an anerobic zone and the second environment may include an aerobic zone and where the compound is configured to flow the plurality of electrons from the anerobic zone to the aerobic zone by electric conduction. The compound where the compound is configured to convert the plurality of electrons into a plurality of reduced species of ions. The compound where the compound is configured to flow the plurality of reduced ions from the aerobic zone to the anerobic zone using ionic conduction. The compound may include coupling an external electrical circuit between the first environment and the second environment, and applying an electrical current or an electrical load to the external electrical circuit. The compound may include coupling an external electrical circuit between the first environment and the second environment, and monitoring a bioelectrical current using the external electrical circuit, and evaluating a bioremediation rate. The compound where the first blend of one or more electrolyte solutions may include at least one electrolyte salt dissolved in an electrolyte solvent. The compound where the first blend of one or more electrolyte solutions is may include of at least one electrolyte salt is selected from the group having of manganese sulfate, calcium nitrate, calcium chloride, sodium acetate, iron-EDTA, biocompatible surfactants, natural minerals, or anthropogenic sources. The compound where the bioremediation composition further may include a surfactant composition capable of increasing the dispersion of the one or more active materials into the bioremediation composition and also increasing ionic conduction. The compound where the contaminated media may include any of a soil, a sediment, a fill material, a groundwater, a surface water, and a waste water.

In one general aspect, a system may include where the contaminated media may include a first environment and is electrically connected to a second environment where an oxidation-reduction potential exists between the first environment and second environment. The system may also include an external electrical circuit configured to be electrically coupled to the first environment and the second environment. The system may furthermore include a bioremediation composition having a first bioremediation composition having a first blend of one or more electrolyte solutions capable of ionic conduction, and a second bioremediation composition having a second blend of one or more active materials and being capable of electric conduction.

Implementations may include one or more of the following features. The system where the electrical circuit is configured to apply an electrical current or an electrical load to the contaminated media. The system where the electrical circuit is configured to monitor a bioelectrical current using the external electrical circuit and to evaluate a bioremediation rate. The system where the bioremediation composition is configured to transfer a plurality of electrons between the first environment and the second environment using the electric conduction and the ionic conduction. The system where the first blend of one or more electrolyte solutions may include at least one electrolyte salt dissolved in an electrolyte solvent. The system where the first blend of one or more electrolyte solutions may include at least one electrolyte salt is selected from the group consisting of manganese sulfate, calcium nitrate, calcium chloride, sodium acetate, iron-EDTA, biocompatible surfactants, natural minerals, or anthropogenic sources. The system where the second blend of one or more active materials may include at least one or more electrically conductive particles. The system where the one or more electrically conductive particles is selected from the group consisting of graphene, carbon black, activated carbon, biochar, carbon nanotubes, magnetite, hematite, conductive polymers, amorphous and mesoporous silica, titanium dioxide, aluminum oxide, metal oxides coated with conductive material, and metal organic frameworks. The system where the contaminated media includes a plurality of naturally occurring microorganisms, and where the one or more electrically conductive particles include a surface and is configured to form a biofilm on the surface with the plurality of naturally occurring microorganisms. The system where the first environment may include an anaerobic zone and the second environment may include an aerobic zone and where the system is configured to flow the plurality of electrons from the anaerobic zone to the aerobic zone by electric conduction. The system where the system is configured to convert the plurality of electrons into a plurality of reduced species of ions. The system where the system is configured to flow the plurality of reduced ions from the aerobic zone to the anaerobic zone using ionic conduction. The system where the bioremediation composition further may include a surfactant composition capable of increasing the dispersion of the one or more active materials into the bioremediation composition and also increasing ionic conduction. The system where the contaminated media may include any of a soil, a sediment, a fill material, a groundwater, a surface water, and a waste water.

DETAILED DESCRIPTION

The ability of some naturally occurring microorganisms to reduce the concentrations of environmental contamination has been well established [15], [16] in the prior art. More recently in the prior art, bioremediation of some contaminates have been achieved using electrochemical methods.[17] Implementations of the current disclosure provide an electrically conductive pathway using particles that can be dispersed through the contaminated media for the purpose of enhancing the rate of bioremediation.

The data presented in this document demonstrate that the introduction of conductive particles (active material) dispersed in an electrolyte solution, with or without the addition of a biocompatible surfactant will improve the electrical current transferred to an external electrical circuit. It should be noted that the terms electrolyte solution and active material are used in a manner consistent with the technology commonly described as a flow electrode. The presence of multiple peaks in some of the power output curves indicate that the microorganisms in these reactors are capable of transferring electrons via a network of conductive pathway consisting of multiple conductive particles to the external electrical circuit. Furthermore, the presence of multiple peaks indicates that electron transfer via an internal pathway as illustrated in the conceptual model section of this document may be occurring.

It will be appreciated by those skilled in the art that implementations of the current disclosure inventively enhance the conditions for extracellular electron transfer by microorganisms by providing an electrically conductive pathway. Certain implementations comprise a biocompatible electrically conductive materials (nano to micrometer particle size) dispersed in an electrolyte solution with or without the aid of a biocompatible surfactant. Such implementations can be directly injected into a contaminated media or emplaced by mechanical mixing. Examples of the types of contamination these implementations can be used to treat include petroleum hydrocarbons, halogenated organic compounds, heavy metals and other inorganics.

Figure 1:
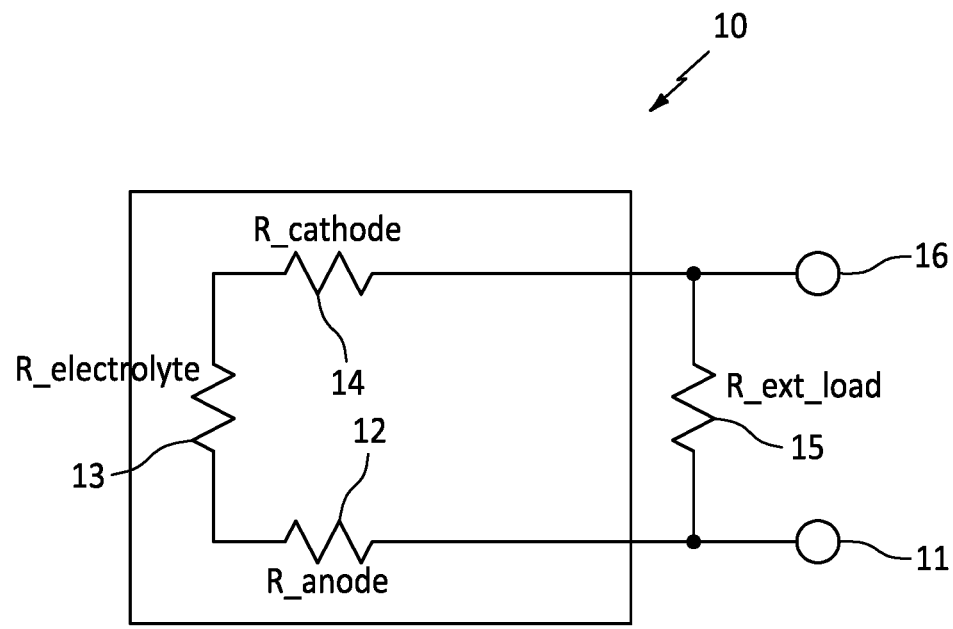
FIG. 1 is a conceptual model of an equivalent electrical circuit of a bioreactor of the prior art.

Referring to FIG. 1, there is shown a conceptual model of an equivalent electrical circuit 10 of a bioreactor of the prior art. Equivalent electrical circuit 10 is provided as a means to describe a system installed in a bioreactor containing solid electrodes. Equivalent electrical circuit 10 includes a first terminal 11, an anode equivalent resistor 12, an electrolyte solution equivalent resistor 13, a cathode equivalent resistor 14, an external load 15 and a second terminal 16 comprising the major components of a standard bioreactor of the prior art. Equivalent electrical circuit 10 is modeled using the representative electrical resistance of anode 12, electrolyte solution 13, cathode 14, and external load 15. The reaction modelled can comprise an anaerobic oxidization of a pollutant. In such a model, electrons are transferred to the anode 12 (R_anode) by microorganisms and exit the bioreactor via a wire to the external load 15 (R_ext_load). The electrons travel to the cathode 14 where an electrochemical reaction stores the charge as a reduced ion. The ion travels through the electrolyte solution 13 at a rate (R_electrolyte) returning the anode 12 to complete the circuit. Where the reaction modeled is comprised of the anaerobic reduction of a pollutant, the flow of electrons and the ions described above would be reversed. As will be disclosed in more detail herein after with reference to FIG. 2, the conceptual model of an equivalent electrical circuit 10 lacks the inventive electrically conductive pathway of the present disclosure.

Figure 2:
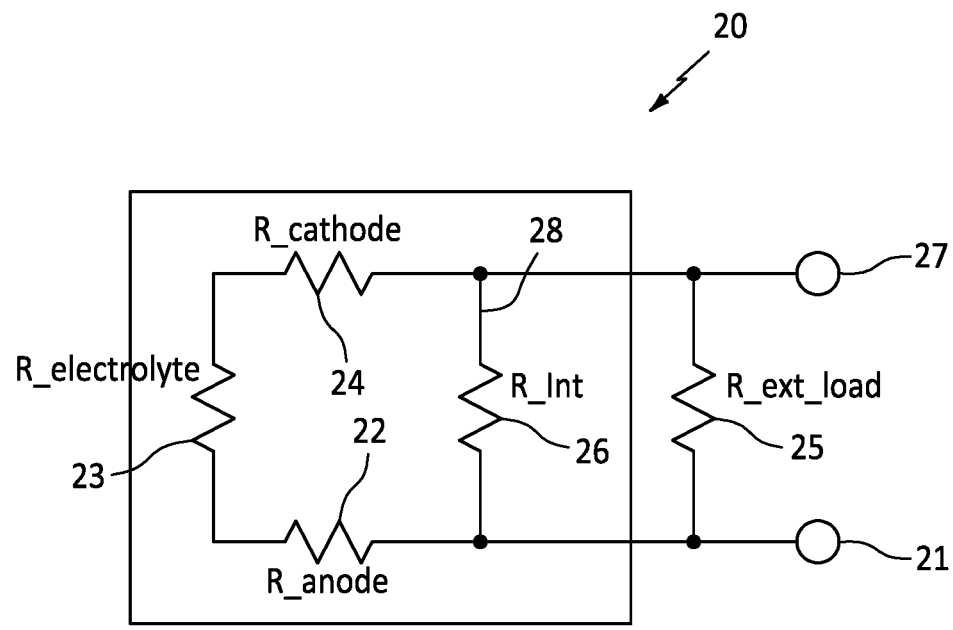
FIG. 2 is an equivalent electrical circuit 20 of a bioreactor in accordance with the current disclosure.

Now referring to FIG. 2, there is shown an equivalent electrical circuit 20 of a bioreactor in accordance with the current disclosure. Equivalent electrical circuit 20 includes a first terminal 21, an anode equivalent resistor 22, an electrolyte solution equivalent resistor 23, a cathode equivalent resistor 24, an external load 25, an internal resistor 26 and a second terminal 27 which comprises the major components of a bioreactor system in accordance with the current disclosure. Internal resistor 26 represents the equivalent resistance of an electrical pathway 28 which is internal to the bioreactor and is comprised of electrically conductive particles as will be disclosed in more detail herein after. The internal pathway 28 consists of electrically conductive particles, allowing electrons to travel between the anode 22 and the cathode 24 without exiting the bioreactor. It should be appreciated by those skilled in the art that the terms electrolyte solution and active material with respect to equivalent electrical circuit 20 are used in a manner consistent with the technology commonly described as a flow electrode. In a particular example, the reaction modelled can comprise an anerobic oxidization of a pollutant. In such an example model, microorganisms transfer electrons to the anode 22. It should be appreciated by those skilled in the art that, in equivalent circuit 20 of the current disclosure, electrons can travel directly to cathode 24 via the internal pathway 28 (R_Int) or through the external load 25 (R_ext_load). Since resistors of internal load 26 and external load 25 are in parallel, they form a current divide. The charge is transferred via an electrochemical reaction at cathode 24 to reduced ions in the electrolyte solution 23 return the charge to anode 22. Where the reaction modeled comprises the anerobic reduction of a pollutant, the flow of electrons and the ions described above would be reversed.

Electron transfer through bioreactor systems in accordance with these implementations can be enhanced in three ways: 1) as a bioelectrochemical system by facilitating the transfer of electrons between microorganisms in environments containing a different oxidation/reduction potential (e.g. anaerobic bacteria can utilize oxygen as an electron acceptor); 2) with an external electrical circuit present to provide or remove electrons, implementations of this system will allow electrons to travel along a conductive pathway created, allowing microorganisms located some distance away from the electrodes to transfer electrons through the external electrical circuit; and/or 3) as a bioelectrical system where microorganisms capable of oxidizing or reducing a specific pollutant can transfer electrons through the conductive pathways consisting of multiple particles to other microorganisms capable of reducing a different pollutant. In all three of these methods disclosed directly above, the electrolyte solution inventively serves as the ionic conductor and completes the bioelectrochemical circuit wherein the bioreactor is configured to flow electrons through the circuit. The importance of the electrolyte solution in this process has been well established in research performed into flow electrodes and flow batteries.[18] Insufficient ionic strength of electrolyte solutions results in an increase in ionic resistance, causing poor performance of the systems.

Multiple researchers in the prior art have established that some metal reducing bacteria are capable of generating conductive nanowires, allowing these microorganisms to transfer electrons to an electrode in the absence of a suitable electron acceptor.[19],[20],[21] Studies have shown that some bacterial nanowires are electrically conductive along a micrometer-length scale.[22] Research by others has identified microorganisms that appear to be capable of direct interspecies energy transfer (DIET).[23][24] That is, the mediated transfer of electrons by two different species by means of activated carbon. Some important distinctions between DIET and implementations of the present disclosure are: the necessity of the electrolyte; the transfer of electrons from these conductive pathways though the external electrical circuit via electrodes; the use of various types of conductive materials; and the creation of complex electrically conductive pathways consisting of multiple conductive particles. Disclosed herein are systems that enhance the rate and distance at which electrons can be transferred by nanowires and other methods of extracellular electron transfer (e.g., direct transfer, conductive pili, electron shuttle, conductive protein etc.) by reducing the electrical and ionic resistances within the system. The reduction in electrical and ionic resistance of implementations of the current disclosure allows microorganisms to generate more electrical current, which results in a proportional increase in the bioremediation of pollution.

Those skilled in the art can consider as an example the case of Geobacter [21] degrading petroleum hydrocarbon contamination with respect to implementations of the current disclosure. Once suitable electron acceptors (i.e., sulfate, ferric iron, etc.) have been depleted, some sulfate-reducing bacteria may transfer electrons to the active material. The electrons will be transported via the active material to an environment where electron acceptors are present. The electrons are then transferred from the active material to the electron acceptor in one of three ways: electrochemical oxidation (e.g., electrons transferred from carbon black particles to dissolved oxygen to form hydrogen peroxide)[25]; the transfer of electrons to another microorganism capable of extracellular transfer (biocathode e.g., *Shewanella* [22] in the presence of sulfate); or to an electrical circuit via a cathode.

In an implementation where the contamination comprises a chlorinated solvent, reductive-dichlorination, bioremediation via reductive dichlorination may occur. In this particular case, the components of the system would be identical to the one described above with reference to FIG. 2; the bioreactor is configured to flow electrons and ions in the reverse direction, allowing electrons to flow into the contaminated zone.

Active Material

The active material of the current disclosure allows electrons to be transferred to the contaminated zone (oxidative bioremediation) or away from the contaminated zone (reductive bioremediation). As part of the current disclosure, examples of active materials that can be used in this system can include: carbon-based material (e.g. graphene, titanium dioxide, aluminum oxide, metal oxides coated with conductive material carbon black, biochar, carbon nanotubes etc.); conductive minerals (e.g. magnetite, hematite, etc.); conductive polymers (PEDOT:PSS); and metal oxide nanoparticles (e.g. amorphous and mesoporous silica, $TiO_2$, $Al_2O_3$, etc.)[26]; or any combination of the above including metal oxides coated with conductive nanoparticle (e.g., graphene coated silica nanoparticles).[27] The concentration of the active materials will depend on the conductivity of the active material and the viscosity required for the application. Concentrations can vary between less than 1-percent to 50-percent (e.g., slurry used in soil mixing).

Electrolyte

It should be appreciated by those skilled in the art that the electrolyte solution 23 completes the circuit by providing a pathway for the charge to return to the reduced environment. The electrolyte 23 may be comprised of salts that are dissolved in an electrolyte solvent or that are present in the treatment water (from an anthropogenic source or a non-anthropogenic source) or may be introduced along with the active materials in the form of salts or biocompatible surfactants. The ideal electrolyte solutions will vary based on the environment of the bacteria and should have minimal effect on the pH and osmotic pressure to avoid negatively affecting the microorganisms. Materials used to increase the ionic conductivity include manganese sulfate, calcium nitrate, calcium chloride, natural minerals, sodium acetate, iron-EDTA and rhamnolipids. The ionic conductivity of the electrolyte should be higher than the electrical conductivity of the active material. This aspect of the system will prevent the ionic resistance of the electrolyte from limiting the overall performance of the system.

Surfactant

As disclosed directly herein above, electrolyte solution 23 can comprise a salt. The concentration of the salt or salts selected for electrolyte solution are limited by the tolerance of the microorganisms present to the specific salt and the stability of the suspension. The "salting out effect" was observed in samples where the active material consisted of a carbon nanoparticle (e.g., graphene and carbon black). The introduction of a biosurfactant (rhamnolipids) improved the stability of the dispersion and also contributed to the conductivity of the electrolyte solution. Biocompatible surfactant compositions may also aid in improving the bioavailability of hydrophobic pollutants. Surfactant concentration used in certain implementations of the current disclosure will depend on the critical micelle concentration (CMC) of the surfactant composition and should not exceed the CMC.

Experiment Setup

Experiments were performed to validate the efficacy of the conceptual model of bioelectrochemical system of FIG. 2. These experiments included a series of experiments to investigate the effect various combinations of active materials, electrolytes, and surfactants have on implementations of bioreactor systems of the current disclosure created from distinct environments. For this purpose, a total of 53 bioreactors were constructed using materials collected from the following subsurface environments: 1) sandy soil with some organics collected from beneath historic bog, 2) histosol collected from historic bog, 3) sandy soil with organics collected from beneath a seasonal wetland associated with a small stream, 4) contaminated sandy till; and 5) contaminated sandy soil. All five of the environments described above were saturated when collected and likely existed as anaerobic environments for most or all of the year. All of the environments contained moderate to very high natural organic material or contained organic pollutants known to biologically degrade (e.g., petroleum hydrocarbons). It should be noted that implementations of the remediation methods disclosed herein apply to other environments including other types of soils, fill materials, surface water, waste water, etc.

The bioreactor systems from each of the five environments described above consisted of soil saturated with groundwater or surface water collected from the specific environment. The saturated soils were containerized in a plastic or glass container with exposed sections of insulated copper wire serving as the electrodes. All of the bioreactors relied on the microorganisms naturally occurring within the soil and water collected from that specific environment described. Electrical current was measured in control bioreactors (no active materials, electrolytes, or surfactants added) made from each of the environments. The comparison between the electrical current measured with a bioreactor of the current disclosure and that of the control bioreactor demonstrates that microorganisms capable of extracellular electron transfer were present in all five environments. As will be disclosed in more detail herein after, the amount of measured current varied significantly between the environments.

Practices were put in place to prevent the contamination of any particular bioreactor by non-native microorganisms which practices include the use of dedicated and single use equipment wherever possible and decontamination using a mild solution of an anionic detergent (Alconox®) followed by rinsing and air drying. The time elapsed between the construction of bioreactors from different environments was at least two weeks. Once any particular bioreactor was sealed, it remained unopened for the duration of the experiment with all electrical measurements made between the first terminal 21 and second electrode 27.

The construction of the 12 bioreactors containing soil and water collected from sandy soil with some organics collected from beneath an historic bog (Environment 1) will now be described in more detail as an example immediately herein below. Saturated soil collected from Environment 1 by hand auger was immediately containerized in a polyethylene bag and sealed with as little headspace as possible. The Environment 1 bioreactor (designated as NB-X) was constructed in four-ounce laboratory jars with Teflon® lids. The soil sample collected from the environment was homogenized (in the absence of air) and 100 ml of saturated soil and 20 ml of surface water were emplaced into each container. Copper wires (22-gauge) with 1-cm exposed were used as the electrodes 21, 27 and installed through pre-drilled holed in the container lid. The anodes 22 were placed at the bottom of the soil jar and the cathodes 24 were inserted approximately 1-cm into the material of Environment 1. Approximately 4-cm of vertical separation (top of anode to bottom of cathode) distance between the electrodes. Once installed, the annular space around the wires were sealed using hot-melt adhesive. In addition to the soil and water, some bioreactors received an electrolyte, an active material or both as summarized in Tables 1. The conductive particles introduced in reactors containing active materials were homogenized with the soil. During this process, these samples were briefly exposed to oxygen-rich air. To ensure consistency in the methodology, this step was also performed on bioreactors that did not contain active material.

Voltage and current measurements were made using a Klein® Tool model MM400 as part of an external electrical circuit attached to electrodes 21, 27. Some variation was observed in the measurements, particularly from those bioreactors containing conductive particles. It is believed that the initial drop in observed voltage may be partially due to capacitance in the system. Multiple readings were taken during each measurement from these reactors and the highest reproducible value was selected as the value recorded. Inorganic parameters (conductivity, temperature, pH, and ORP) were measured using an In-Situ Aqua Troll 400 water quality meter. It should be appreciated by those skilled in the art that monitoring equipment can be attached to electrodes 21, 27 during in situ remediation of a contaminated material in a field application of the disclosed methods. It should be further appreciated that a voltage or current can be applied to electrodes 21, 27 during in situ remediation of a contaminated material in a field application of the disclosed methods to increase, stimulate or reverse the bioremediation of the contaminated media. In such applications, processors and computing equipment can be used to enhance or simplify the systems and methods disclosed herein.

Material Description

As disclosed herein above, and to validate the bioreactor of the current disclosure, a total of 12 bioreactors were built using Environment 1, comprising sandy wetland material containing some organics located immediately beneath a historic bog. The sediment consisted of fine to medium tan sand with some silt and coarse sand, and organics. Environment 1 is saturated year-round and is believed to remain anaerobic at all times.

Referring to Table 1 herein below, the various bioreactors disclosed herein above are designated as NB-X wherein NB-1 is the experimental control and contains unaltered soil and surface water from Environment 1. Bioreactors NB-2, NB-3, NB-4, and NB-5 are the controls containing only electrolytes and contain varying amounts of magnesium sulfate ($MgSO_4$) to evaluate the role of the electrolyte absent of electrically conductive materials. Bioreactors NB-6 and NB-7 are designed to evaluate the use of active materials (carbon black and activated carbon respectively) in the absence of the electrolyte solution. Bioreactors NB-8 through NB-12 contain both an active material (carbon black, activated carbon, graphene, and a carbon nanotube/carbon black blend) and $MgSO_4$ to increase the ionic conductivity. An additional bioreactor, designated as NB-13 in Table 1, was created using only water from Environment 1 mixed with the electrolyte. The substances and their quantities contained in each bioreactor are provided in Table 1.

inventive nature of the current disclosure in that conductivity measured increased proportionally with increasing electrolyte concentration. Bioreactors NB-6 and NB-7, which contained natural water (no electrolyte added) were slightly higher than the ionic conductivity of the water in the control bioreactor NB-1. An increase of about 125 µS/cm was observed in these bioreactors indicating that low levels of impurities contained in the carbon black and activated carbon may have slightly increased the conductivity in these bioreactors. A similar increase (about 250 µS/cm) was also observed when comparing bioreactors NB-8 and NB-9 with the electrolyte control bioreactor NB-3. The increases in conductivity relative their respective controls are not believed to have significantly impacted the results; however, this small change in conductivity should be considered when interpreting the results from bioreactors NB-6, NB-7, NB-8, and NB-9.

The ionic conductivities measured in the fluid contained in reactors NB-10 and NB-11 after the 47-day test period were all similar to the control bioreactor NB-3. This indicates that the conductive materials (graphene and carbon nanotubes) introduced at the concentrations used in this test did, in accordance with the current disclosure, increase the ionic conductivity of these reactors. Bioreactor NB-12, which also contains carbon nanotubes but at a higher concentration than NB-11, contained insufficient fluid to measure the conductivity. The insufficient fluid to measure the conductivity is due to the high volume of material added (density of carbon nanotube material is significantly less than other conductive materials).

TABLE 1

Summary of Materials

| Bioreactor ID | Soil Vol. (ml) | Active Material | Mass of Active Material (g) | Electrolyte | Electrolyte Vol (ml) |
|---|---|---|---|---|---|
| NB-1 | 100 | None | 0 | E1W | 20 |
| NB-2 | 100 | None | 0 | E1W + MgSO4 (0.08 g) | 20 |
| NB-3 | 100 | None | 0 | E1W + MgSO4 (0.16 g) | 20 |
| NB-4 | 100 | None | 0 | E1W + MgSO4 (0.24 g) | 20 |
| NB-5 | 100 | None | 0 | E1W + MgSO4 (0.4 g) | 20 |
| NB-6 | 100 | CB | 2.0 | E1W | 20 |
| NB-7 | 100 | AC | 2.0 | E1W | 20 |
| NB-8 | 100 | CB | 2.0 | E1W + MgSO4 (0.16 g) | 20 |
| NB-9 | 100 | AC | 2.0 | E1W + MgSO4 (0.16 g) | 20 |
| NB-10 | 100 | GN | 2.0 | E1W + MgSO4 (0.16 g) | 20 |
| NB-11 | 100 | CNT/CB | 0.2 | E1W + MgSO4 (0.16 g) | 20 |
| NB-12 | 100 | CNT/CB | 1.0 | E1W + MgSO4 (0.16 g) | 20 |
| NB-13 | 0 | None | 0 | E1W + MgSO4 (0.16 g) | 20 |

E1W = Environment 1 Water;
MgSO4 = magnesium sulfate;
AC = activated carbon nano powder;
CB = carbon black nano powder;
GN = Graphene nanoplatlets;
CNT/CB = Carbon nanotube/carbon black blend The test period was 47 days and following the test period and the completion of measurements, the bioreactors were unsealed and the ionic conductivity of the fluid in each bioreactor was measured using an EXTECH® brand conductivity meter. The electrolyte concentration measured in parts per million (ppm) and conductivity measured in microsiemens per centimeter (µS/cm) bioreactors for each of the bioreactors are disclosed in Table 2 herein below. With reference to Table 2, the conductivity measured in the control bioreactor NB-1 and the electrolyte controls of bioreactors NB-2, NB-3, NB-4, and NB-5 demonstrate the

TABLE 2

Electrolyte Concentration and Conductivity

| Bioreactor | Description | Electrolyte Concentration (ppm) | Conductivity (uS/cm) |
|---|---|---|---|
| NB-1 | E1W (Control) | Natural Water | 257 |
| NB-2 | E1W + MgSO4 (0.08 g) | 4 | 1,170 |
| NB-3 | E1W + MgSO4 (0.16 g) | 8 | 1,793 |
| NB-4 | E1W + MgSO4 (0.24 g) | 12 | 2,080 |

TABLE 2-continued

Electrolyte Concentration and Conductivity

| Bioreactor | Description | Electrolyte Concentration (ppm) | Conductivity (uS/cm) |
|---|---|---|---|
| NB-5 | E1W + MgSO4 (0.4 g) | 20 | 3,920 |
| NB-6 | CB + E1W | Natural Water | 384 |
| NB-7 | AC + E1W | Natural Water | 386 |
| NB-8 | CB + E1W + MgSO4 (0.16 g) | 8 | 1,979 |
| NB-9 | AC + E1W + MgSO4 (0.16 g) | 8 | 2,040 |
| NB-10 | GN + E1W + MgSO4 (0.16 g) | 8 | 1,687 |
| NB-11 | CNT (0.2 g) + E1W + MgSO4 (0.16 g) | 8 | 1,721 |
| NB-12 | CB (1.0 g) + E1W + MgSO4 (0.16 g) | 8 | NM |

Referring back to FIG. 2, and as it relates to the experimental set up disclosed immediately herein above, external load 25 on bioreactors NB-1 through NB-13 was disconnected (open circuit) for the initial 16 days following the construction of the bioreactors. Beginning on day 17, external load 25 was competed using physical resistors and increased every day in intervals of 10,000 ohms. The voltage across the resistor was measured after it had been in place for approximately 24-hours and was used to calculate the current and power.

Results

Those skilled in the art should appreciate that the Maximum Power Transfer Theorem states that the maximum power in an external electrical circuit will occur when the external resistance is equal to the internal resistance. Energy harvesting devices (e.g., microbial fuel cells and photo voltaic cells) use a Maximum Power Point Tracking (MPPT) circuit to identify and adjust the external load so that the system is optimized to produce as much power as possible. [28] MPPT circuits apply an algorithm to determine when it is necessary to change the external resistance. One common algorithm used is known as the "hill climbing algorithm" where a plot of the voltage versus current is used to determine if the slope of the line connecting the current data point and the prior data point is positive or negative. Because an inflection point occurs at the maximum power point, the slope of the line change from positive to negative as the external resistance is increased past the internal resistance. When this occurs, the external resistance is reduced and the process is repeated. The MPPT will approximate the maximum power transfer point through iteration of this or a similar algorithm.

Those skilled in the art can appreciate that it is also possible to use the Maximum Power Transfer Theorem to identify the internal resistance. Similar to the "hill climbing" algorithm, the power through the external electrical circuit can be calculated by measuring the voltage across a known resistor. Assuming a resistor of increasing resistance is added, the power through the external load 25 will increase as the value of the external resistance approaches the value of the internal resistance. Once the external resistance is greater than the internal resistance the power through the external electrical circuit will decrease. In this manner, during the experiments disclosed herein above, the MPPT and the internal resistance was determined for each bioreactor. The identification of the MPPT allows the currents observed at these points in different bioreactors to be compared. If currents are compared at conditions away from this maximum, the results of the experiments could be misleading.

Figure 3:
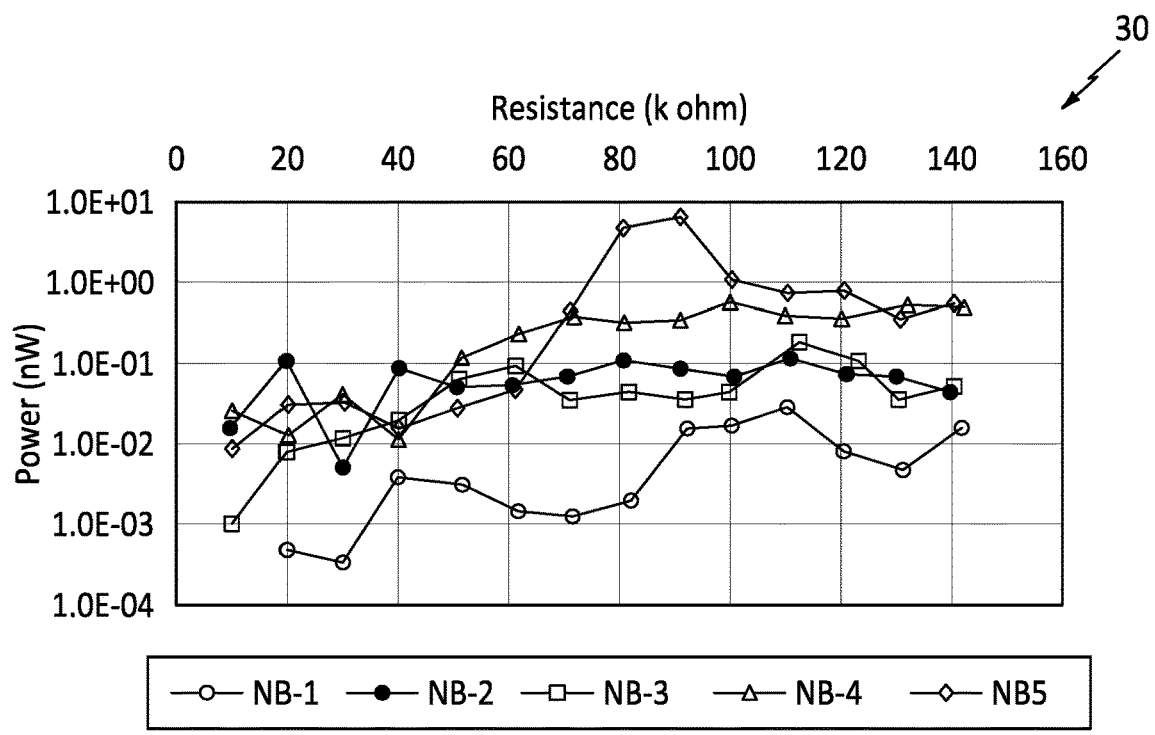
FIG. 3 is a graphical representation of the performance of various bioreactors in accordance with the current disclosure.

The results of the experiments disclosed herein above are graphically disclosed below with reference to the various figures and are specific to the 12 bioreactors constructed using soil and water from Environment 1. As disclosed herein above, bioreactor NB-1 serves as the control for this experiment and contained only soil and water from Environment 1. Bioreactors NB-2, NB-3, NB-4, and NB-5 contained soil and water from Environment 1 as well as increasing concentrations of magnesium sulfate. Referring to FIG. 3, there is shown a logarithmic graphical representation 30 of the resistance of external load 25 (k Ohms) versus power (nW) of bioreactors NB-1 (control) through NB-5. As shown on the logarithmic scale, the power output of the various bioreactors NB-1 through NB-5 generally increases with increasing electrolyte concentration as inventively disclosed herein above. The maximum power point was observed around 110 k Ohms in reactors NB-1, NB-2, NB-3, and around 100 k Ohms in bioreactor NB-4, and around 90 k Ohms in bioreactor NB-5.

Figure 4:
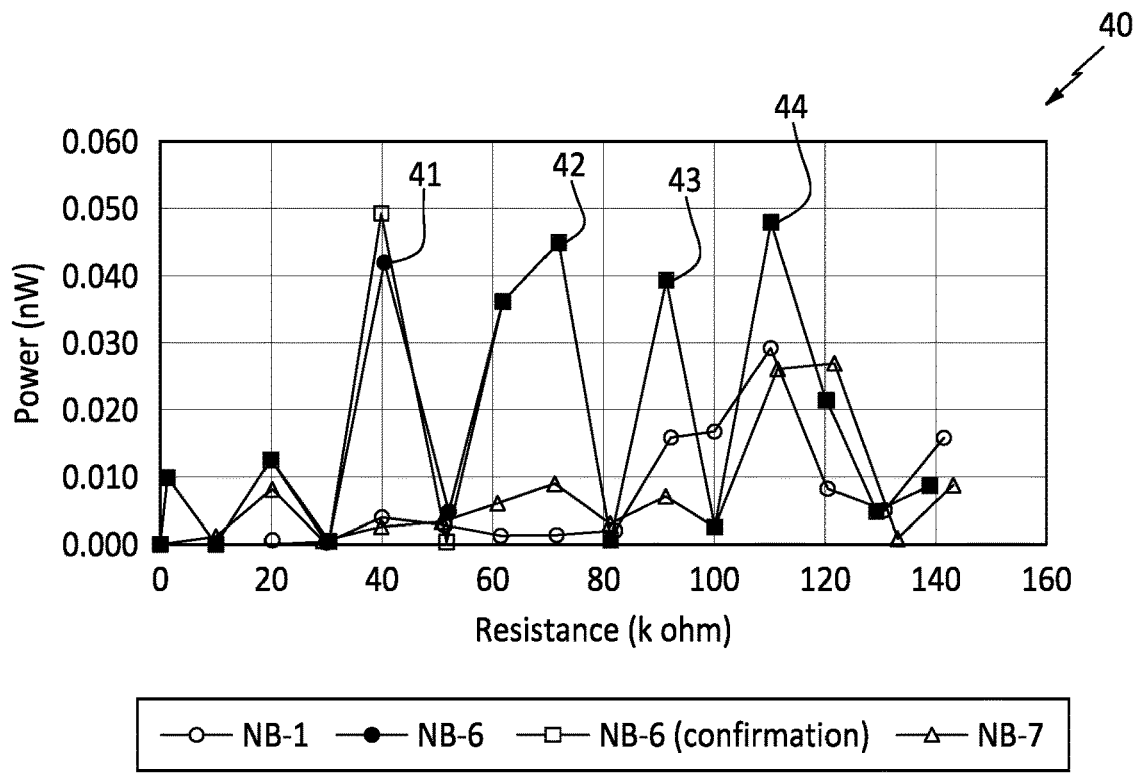
FIG. 4 is a graphical representation of the performance of various bioreactors in accordance with the current disclosure.

As disclosed herein above, bioreactors NB-6 and NB-7 contained active material in the form of carbon black and activated carbon respectively. Referring next to FIG. 4, there is shown a graphical representation 40 of the resistance of external load 25 (k Ohms) versus power (nW) of bioreactor NB-1 (control) and bioreactors NB-6 and NB-7. When compared to the bioreactor NB-1 (control), the maximum output of bioreactor NB-7 is very similar, indicating that activated carbon alone did not improve the current in this bioreactor. The power output from bioreactor NB-6 appears to have multiple peaks 41-44. Following the completion of the test, the peak around 40 k Ohms was remeasured to confirm these results and was plotted in FIG. 4 designated as NB-6 (confirmation). The results of the confirmation testing matched the initial measurements very well, indicating that the peaks 41-45 observed in this bioreactor are reproducible.

Figure 5:
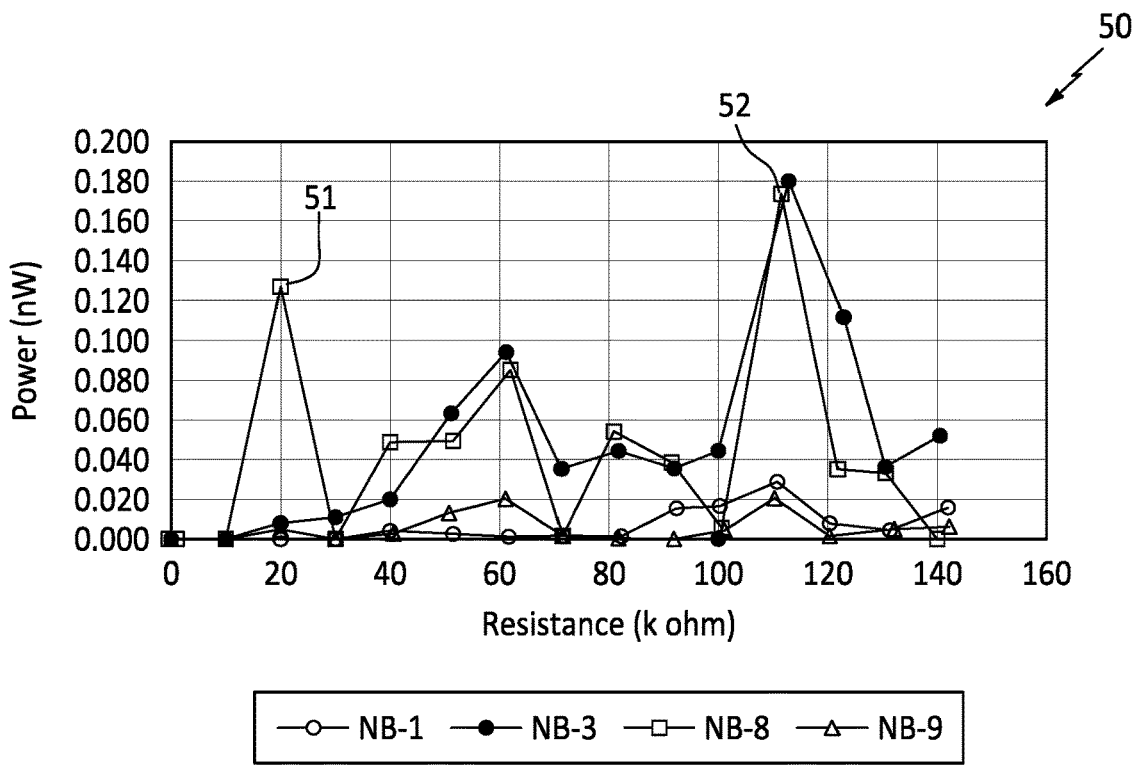
FIG. 5 is a graphical representation of the performance of various bioreactors in accordance with the current disclosure.

Now referring to FIG. 5, there is shown a graphical representation 50 of the resistance of external load 25 (k Ohms) versus power (nW) of bioreactor NB-1 (control) and bioreactors NB-3, NB-8 and NB-9. As disclosed herein above, bioreactor NB-8 contains carbon black and an electrolyte solution identical in concentration to bioreactor NB-3. As can be seen from the figure, the power output for bioreactor NB-8 is similar to the power output for the control bioreactor NB-3, with the possible exception of peak 51 observed around 20 k Ohms and peak 52 around 110 k Ohms. Little to no increase in power was observed in bioreactor NB-8 relative to the controls under these test conditions. This indicates that the introduction of carbon black and electrolyte solution at these concentrations did not increase the current transferred to an external electrical circuit in this environment.

Still referring to FIG. 5, bioreactor NB-9 contained active carbon and electrolyte solution at the same concentration as bioreactor NB-3. Despite the presence of the electrolyte solution, the power output for bioreactor NB-9 output power is similar to that of bioreactor NB-1, which is the control (no active material and no electrolyte). It is possible that the charge transferred by the microorganism to the activated carbon is interacting with the ions, similar to the manner in which a charge is stored in a double layer capacitor. Regardless of the reason, the introduction of activated carbon and electrolyte at these concentrations did not improve the current transferred to the external electrical circuit under in this environment.

Figure 6:
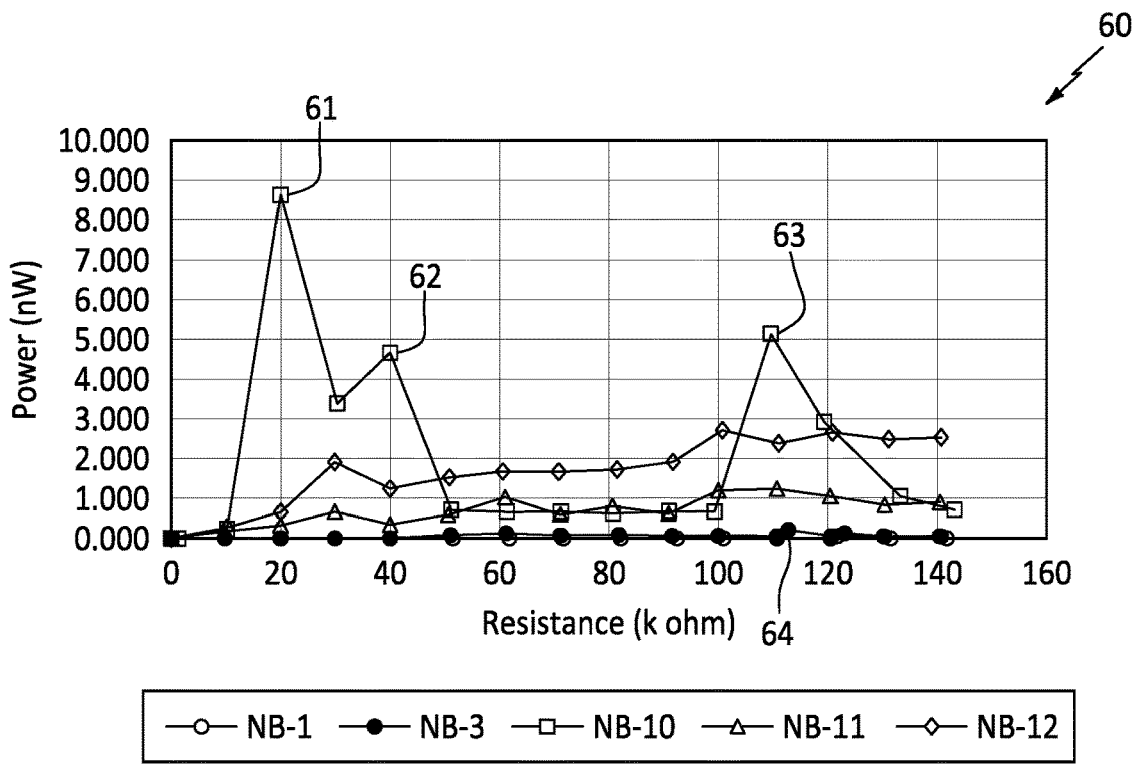
FIG. 6 is a graphical representation of the performance of various bioreactors in accordance with the current disclosure.

Referring to FIG. 6 there is shown a graphical representation 60 of the resistance of external load 25 (k Ohms) versus power (nW) of bioreactor NB-1 (control) and bioreactors NB-3, NB-10, NB-11 and NB-12. It can be seen from the figure that bioreactor NB-10 had a peak 61 of approximately 8800 nW and represents the highest power output of all the bioreactors tested from Environment 1 and, as will be disclosed herein after, it is also higher than any of the other environments previously tested. Bioreactor NB-10 contained graphene as the active material and an electrolyte solution equal to the concentration in NB-3. The maximum power was observed around 20 k Ohms at peak 61 and represents a 50-times increase over the maximum power observed in the control bioreactor NB-3 power level 64 for the same external load 25. The power curve for bioreactor NB-10 also shows the clearest example of multiple peaks with reference to peaks 61-63.

Still referring to FIG. 6, bioreactors NB-11 and NB-12 both contain carbon nanotube as the active material and an electrolyte solution equal to the solution in NB-3. Specifically, bioreactor NB-11 contains 0.1 gram of graphene while bioreactor NB-12 contains 1.0 gram. The maximum power output of bioreactor NB-11 was around 6.5 times the maximum power output observed in the control bioreactor NB-3. Similarly, the maximum power output observed in bioreactor NB-12 was 15 times the maximum power output observed in the control bioreactor NB-3.

Conclusion

As part of an effort to prove the efficacy of the bioreactors disclosed herein, bioreactors were constructed using soil and water collected from five different environments and to evaluate the benefits of introducing electrically conductive particles in an electrolyte solution for the purpose of enhancing the bioremediation rate. The results of experiments disclosed herein, demonstrate that implementations of a novel bioreactor systems successfully increased the bioelectrical current in reactors constructed from different environments. In testing disclosed herein, as well as in test Environments 2 and 3, decaying organic matter was present and likely served as the carbon source for the anaerobic oxidation reaction. Environments 4 and 5 were comprised of soil and groundwater contaminated with petroleum hydrocarbons from a documented historic gasoline release. Analytical results from these environments were collected and showed that aromatic hydrocarbons known to be biodegradable were present at moderate concentrations. Both of the environments contaminated by petroleum hydrocarbons (Environments 4 and 5) did not contain any visual evidence of decaying organic matter. Based on the depositional environment (glacial till and glacial outwash) it is believe that these materials contain little to no decaying organic matter. Therefore, it is likely that the biodegradable petroleum hydrocarbons known to be present in these bioreactors served as the carbon-source for the anerobic oxidation reactions believed to have generated the bioelectricity detected. As disclosed herein above and in the microbial electrochemistry the increase in electrical current observed during experimentation correlates to a proportional increase in the bioremediation rate.

The bioelectricity measured in these reactors were produced by microorganisms capable of extracellular electron transfer through the external electrical load 25. An increase in electrical current over the control bioreactor was observed in bioreactors containing carbon black, graphene, carbon nanotube as active materials during this testing using soil and water from Environment 1. In addition to the active materials identified above, additional testing conducted in bioreactors has shown similar increase in electrical current when the active materials consist of activated biochar or hematite. While the amount of electrical current produced by bioreactors of the current disclosure under natural conditions (no addition of active material, electrolyte, or surfactant) in each environment varied, a current was detected in all five environments. These results are significant because they indicate that microorganisms capable of extracellular electron transfer are present in all of these environments.

Since the internal resistance of the various bioreactors varies, the voltage and current measurements from the different reactors are comparable only when the cell is in open circuit (voltage), short circuited (current) conditions or at the maximum power transfer point. The power curves for the control bioreactor NB-3 (no active materials added) provided in FIG. 3, show that the comparison of observations made using portions of the curve not located near the maximum power transfer point could lead to incorrect conclusions regarding the relative outputs of the different bioreactors. For example, the power output for bioreactor NB-5 where the external resistance of external load 25 is between 40 and 60 k Ohms is less than the outputs for several other bioreactors having an external load in same range. However, it is clear from the data shown in FIG. 3 that the maximum power output for bioreactor NB-5 is significantly higher than the other controls.

As stated herein before, the maximum power transfer theorem states that the greatest amount of power will be transferred to the external electrical circuit when the internal resistance and the external resistance are equal. The "hill climbing" and other common algorithms used in MPPT circuits work well for a system with a single maximum. However, it is known by those skilled in the art that these algorithms may have difficulty identifying the global maximum in power curves containing multiple peaks. [29] For instance, multiple peaks in the power output curves produced by photovoltaic (PV) arrays have been studied under partial shading conditions.[30] The multiple peaks are attributed to the varying outputs of current from PV cells throughout the array and is due to array configuration (i.e. multiple cells in series and parallel). The power curve showing the output of bioreactor NB-10 of FIG. 6 shows a clear indication of multiple peaks 61-63. Initial peak 61 is approximately around external load 25 having 20 k Ohms resistance, a second peak 62 is approximately around external load 25 having around 40 k Ohms of resistance and a third peak 63 is approximately around external load 25 having around 110 k Ohms of resistance. Although not a pronounced in FIG. 6, the power curve for bioreactor NB-12 and possibly for bioreactor NB-11 may also contain multiple peaks. An analogy can be made to PV arrays that suggests that there is an array of power sources in series and parallel within the bioreactors of the present disclosure having multiple peaks in the power output curve. This heretofore unknown result indicates that microorganisms located some distance away from the electrode were able to transfer electrons to the external electrical circuit via a pathway consisting of multiple conductive particles when an electrolyte was present in some implementations of bioreactors of the present disclosure. Furthermore, the multiple peaks indicate the transfer of electrons through the internal pathway 28 (FIG. 2) of internal resistance 26 (R_INT) representing the electrically conductive particles is possible.

The disclosure of the bioreactor systems and methods and data disclosed herein inventively demonstrate that the introduction of conductive particles (active material) dispersed in an electrolyte solution, with or without the addition of a biocompatible surfactant will improve the electrical current transferred to an external electrical circuit of a bioreactor. The presence of multiple peaks in some of the power output curves indicate that microorganisms are capable of transferring electrons via a conductive pathway consisting of multiple conductive particles to the external load 25, creating a complex array of power sources. Furthermore, this indicates that electron transfer via an internal pathway 28 of electrically conductive particles is possible as illustrated in the conceptual model of FIG. 2. While the maximum power measured in the external load 25 is very low, the increase in the current over the control bioreactor NB-1 measured in multiple bioreactors of the present disclosure represents an increase of at least an order of magnitude over that of the prior art. The observed increase in current would result in an order of magnitude or more increase in the bioremediation rate when compared the identical system not containing active materials and electrolytes of the present disclosure.

An in situ treatment of a contaminated media can be remediated using bioremediation compositions disclosed herein. In operation, a bioremediation composition comprising an aqueous solution of an electrolyte and active materials (conductive particles) is prepared in accordance with the disclosures herein above. The bioremediation composition containing the conductive particles and the electrolyte is emplaced in the contaminated media via injection or mixing or other suitable method. The contaminated media comprises naturally occurring microorganisms that are capable of transferring electrons extracellularly and will develop as a biofilm on the surfaces of the conductive particles. The conductive particles form conductive pathways connecting the contaminated media comprising a first environment to a second environment outside of the contaminated media where an oxidation-reduction potential between the two environments. In some instances, the first environment can comprise an anerobic zone (where the contamination exists) and the second environment can comprise an aerobic zone (located just outside the polluted media). Electrons travel from the anerobic zone to the aerobic zone across the conductive pathways by electric conduction and arrive at the second environment where the electrochemical or biochemical reduction of the ion present in the electrolyte solution is favorable. In a particular example where magnesium sulfate ($MgSO_4$) is used as the electrolyte salt, the sulfate ion would be reduced to sulfite ($SO_3$) as it accepts an electron. Once reduced, the charge is temporarily stored as chemical energy. As part of the biochemical reaction, the reduced ion, $SO_3$ in this example, travels back to the contaminated media by ionic conduction, from the aerobic zone to the anerobic zone, through the electrolyte and completing the circuit (FIG. 2).

Figure 7:
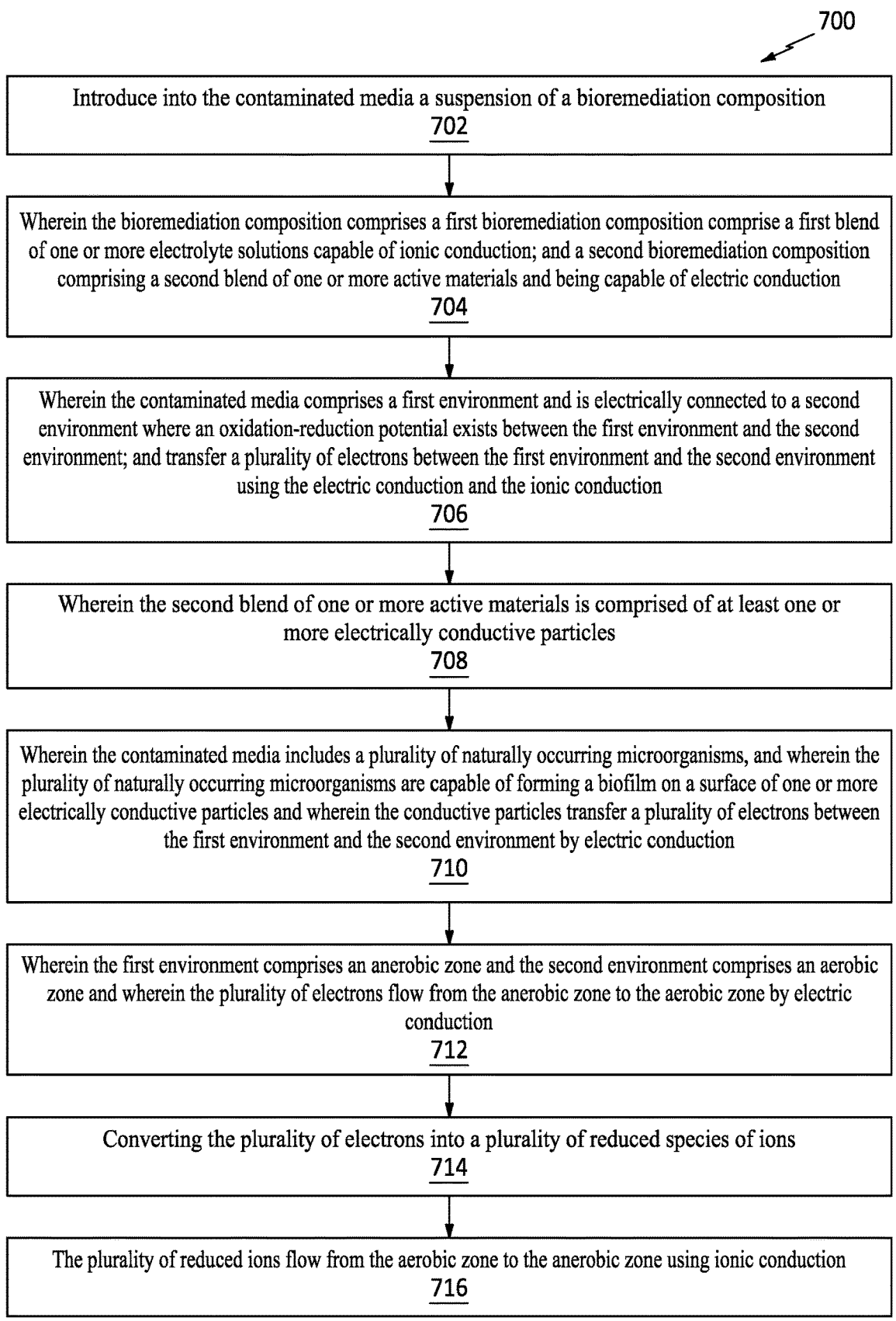
FIG. 7 is a flow chart of a process of remediation in accordance with an example of the present disclosure.

FIG. 7 is a flow chart of a process 700, according to an example of the present disclosure. According to an example, one or more process blocks of FIG. 7 may be performed by introducing a bioremediation compound into a contaminated media.

As shown in FIG. 7, process 700 may include introducing into the contaminated media a suspension of a bioremediation composition (block 702). For example, bioremediation compound may be introduce into the contaminated media as a suspension of the bioremediation composition, as described above. As in addition shown in FIG. 7, process 700 may include where the bioremediation composition may include a first bioremediation composition having a first blend of one or more electrolyte solutions capable of ionic conduction; and a second bioremediation composition having a second blend of one or more active materials and being capable of electric conduction (block 704). For example, bioremediation compound may include a bioremediation composition which itself may include a first bioremediation composition which may include a first blend of one or more electrolyte solutions capable of ionic conduction; and a second bioremediation composition having a second blend of one or more active materials and being capable of electric conduction, as described above.

Process 700 may include additional implementations, such as any single implementation or any combination of implementations described below and/or in connection with one or more other processes described elsewhere herein. For instance, process 700 further includes where the contaminated media may include a first environment and is electrically connected to a second environment where an oxidation-reduction potential exists between the first environment and the second environment and transferring a plurality of electrons between the first environment and the second environment using the electric conduction and the ionic conduction (block 706).

At block 708, the second blend of one or more active materials may include of at least one or more electrically conductive particles.

At block 710, the contaminated media includes a plurality of naturally occurring microorganisms, and where the plurality of naturally occurring microorganisms are capable of forming a biofilm on a surface of one or more electrically conductive particles and where the conductive particles transfer a plurality of electrons between the first environment and the second environment by electric conduction.

At block 712, the first environment may include an anerobic zone and the second environment may include an aerobic zone and where the plurality of electrons flow from the anerobic zone to the aerobic zone by electric conduction.

At block 714, process 700 may include converting the plurality of electrons into a plurality of reduced species of ions.

At block 716, process 700 may include where the plurality of reduced ions flow from the aerobic zone to the anerobic zone using ionic conduction.

It should be noted that while FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise form disclosed. Modifications may be made in light of the above disclosure or may be acquired from practice of the implementations. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

REFERENCES

1. Green Remediation Best Management Practices: Bioremediation; Office of Superfund Remediation and Technology Innovation, 2010. (Web accessed: Jul. 19, 2021; https://semspub.epa.gov/work/HQ/147895.pdf)
2. Green Remediation Best Management Practices: Bioremediation; Office of Superfund Remediation and Technology Innovation, 2010. (Web accessed: Jul. 19, 2021; https://semspub.epa.gov/work/HQ/147895.pdf)
3. How to Evaluate Alternative Cleanup Technologies for Underground Storage Tank Sites: A Guide for Corrective Action Plan Reviews; Chapter XIV Enhanced Anaerobic Oxidative Bioremediation: U.S. EPA, Land and Emergency Management, October 2017. (Web accessed: Jul. 19, 2021; https://www.epa.gov/sites/default/files/2016-11/documents/tum-ch14-rev.pdf)
4. How to Evaluate Alternative Clean-up Strategies for Underground Storage Tank Sites: Chapter XIV—Enhanced Anerobic Oxidative Bioremediation. EPA Land and Emergency Management, October 2017. (Web accessed: Aug. 2, 2021; https://www.epa.gov/sites/default/files/2016-11/documents/tum-ch14-rev.pdf)
5. Engineering Approaches to In Situ Bioremediation of Chlorinated Solvents: Fundamentals and Field applications; U.S. EPA, Solid Waste and Emergency Response; July 2000. (Web accessed: Jul. 19, 2021; https://clu-in.org/download/remed/engappinsitbio.pdf
6. Technical Protocol for Enhanced Anerobic Bioremediation using Permeable Mulch Bio walls and Bioreactors. Air Force Center for Engineering and Environmental Directorate; May 2008. (Web accessed: Aug. 2, 2021; https://clu-in.org/download/techfocus/prb/Final-Biowall-Protocol-05-08.pdf)
7. Dinesh Mohan, Kunwar P. Singh, Vinod K. Singh. Wastewater treatment using low cost activated carbons derived from agricultural byproducts—A case study. Journal of Hazardous Materials, Volume 152, Issue 3, 2008, Pages 1045-1053, ISSN 0304-3894. https://doi.org/10.1016/j.jhazmat.2007.07.079.
8. Anett Georgi, Ariette Schierz, Katrin Mackenzie, Frank-Dieter Kopinke. Colloidal activated carbon for in-situ groundwater remediation—Transport characteristics and adsorption of organic compounds in water-saturated sediment columns. Journal of Contaminant Hydrology, Volume 179, 2015, Pages 76-88, ISSN 0169-7722, https://doi.org/10.1016/j.jconhyd.2015.05.002.
9. McGregor, R. In Situ treatment of PFAS-impacted groundwater using colloidal activated carbon. Remediation. 2018; 28: 33-41. https://www.scirp.org/journal/paperinformation.aspx?paperid=105733
10. Mishra G K. Microbes in Heavy Metal Remediation: A Review on Current Trends and Patents. Recent Pat Biotechnology. 2017; 11(3):188-196. doi: 10.2174/1872208311666170120121025. PMID: 28116999.
11. Bernard E. Igiri, Stanley I. R. Okoduwa, Grace O. Idoko, Ebere P. Akabuogu, Abraham O. Adeyi, Ibe K. Ejiogu, "Toxicity and Bioremediation of Heavy Metals Contaminated Ecosystem from Tannery Wastewater: A Review", Journal of Toxicology, vol. 2018, Article ID 2568038, 16 pages, 2018. https://doi.org/10.1155/2018/2568038
12. Pous, Narcis. et. Al (2017). Opportunities for groundwater microbial electro-remediation. Microbial Biotechnology
13. Technical Protocol for Enhanced Anerobic Bioremediation using Permeable Mulch Bio walls and Bioreactors. Air Force Center for Engineering and Environmental Directorate; May 2008. (Web accessed: Aug. 2, 2021; https://clu-in.org/download/techfocus/prb/Final-Biowall-Protocol-05-08.pdf)
14. Pous, Narcis. et. Al (2017). Opportunities for groundwater microbial electro-remediation. Microbial Biotechnology
15. Atlas, Ronald M. Philp, Jim. (2005). Bioremediation—Applied Microbial Solutions for Real-World Environmental Cleanup—5.1 Approaches to Soil and Aquifer Bioremediation. American Society for Microbiology (ASM). Retrieved from https://app.knovel.com/hotlink/pdf/id:kt009183H1/bioremediation-applied/approaches-soil-aquifer
16. Alexander, Martin. (1999). Biodegradation and Bioremediation. Academic Press. (Web accessed Jul. 22, 2021)
17. Choi, O., Sang, B I. Extracellular electron transfer from cathode to microbes: application for biofuel production. Biotechnology Biofuels 9, 11 (2016). https://doi.org/10.1186/s13068-016-0426-0
18. Chakrabarti, Barun & Kalamaras, Evangelos & Singh, Abhishek & Bertei, Antonio & Rubio Garcia, Javier & Yufit, Vladimir & Tenny, Kevin & Wu, Billy & Tariq, Farid & Hajimolana, Yashar & Brandon, Nigel & Low, John & Roberts, Edward & Chiang, Yet-Ming & Brushett, Fikile. (2020). Modelling of redox flow battery electrode processes at a range of length scales: a review. Sustainable Energy & Fuels. 4. 10.1039/D0SE00667J.
19. Choi, O., Sang, B I. Extracellular electron transfer from cathode to microbes: application for biofuel production. Biotechnology Biofuels 9, 11 (2016). https://doi.org/10.1186/s13068-016-0426-0.
20. Promoting Shewanella Bidirectional Extracellular Electron Transfer for Bioelectrocatalysis by Electropolymerized Riboflavin Interface on Carbon Electrode
21. Lovely, Derick R and David J. F. Walker; Geobacter Protein Nanowires; Front. Microbiol., 24 Sep. 2019
22. El-Naggar, Mohamed Y et al. "Electrical Transport Along Bacterial Nanowires from *Shewanella Oneidensis* MR-1." Proceedings of the National Academy of Sciences—PNAS 107.42 (2010): 18127-18131.
23. Lovley, D. R. Reach out and touch someone: potential impact of DIET (direct interspecies energy transfer) on anaerobic biogeochemistry, bioremediation, and bioenergy. Rev Environ Sci Biotechnol 10, 101-105 (2011). https://doi.org/10.1007/s11157-011-9236-9

24. Igarashi K, Miyako E, Kato S. Direct Interspecies Electron Transfer Mediated by Graphene Oxide-Based Materials. Front Microbiol. 2020 Jan. 17; 10:3068. doi: 10.3389/fmicb.2019.03068. PMID: 32010112; PMCID: PMC6978667.
25. Kia Sun, Electrochemical Oxygen Reduction to Hydrogen Peroxide via a Two-Electron Transfer Pathway on Carbon-Based Single-Atom Catalysts, 2020.
26. Chereches, Elena lonela and Alina Adriana Minea; Electrical Conductivity of New Nanoparticles Enhanced Fluids: an Experimental Study; Nanomaterials, August 2019.
27. Yang, K., Chen, B. & Zhu, L. Graphene-coated materials using silica particles as a framework for highly efficient removal of aromatic pollutants in water. Sci Rep 5, 11641 (2015). https://doi.org/10.1038/srep11641
28. K. Sundareswaran, S. Peddapati and S. Palani, "MPPT of PV Systems Under Partial Shaded Conditions Through a Colony of Flashing Fireflies," in IEEE Transactions on Energy Conversion, vol. 29, no. 2, pp. 463-472, June 2014, doi: 10.1109/TEC.2014.2298237.
29. K. Sundareswaran, S. Peddapati and S. Palani, "MPPT of PV Systems Under Partial Shaded Conditions Through a Colony of Flashing Fireflies," in IEEE Transactions on Energy Conversion, vol. 29, no. 2, pp. 463-472, June 2014, doi: 10.1109/TEC.2014.2298237.
30. 30 Baba, Ali & Liu, Guangyu & Chen, Xiaohui. (2020). Classification and Evaluation Review of Maximum Power Point Tracking Methods. Sustainable Futures. 2. 100020. 10.1016/j.sftr.2020.100020.

What is claimed is:

1. A method of in situ remediation of contaminated media comprising:
   introducing into the contaminated media a suspension of a bioremediation composition;
   wherein the bioremediation composition comprises:
      a first bioremediation composition comprising an electrolyte solution capable of ionic conduction; and
      a second bioremediation composition comprising an active material capable of electric conduction;
   wherein the contaminated media comprises a first environment and is electrically connected to a second environment where an oxidation-reduction potential exists between the first environment and the second environment; and
   transferring a plurality of electrons between the first environment and the second environment using the electric conduction and the ionic conduction.

2. The method of in situ remediation of contaminated media of claim 1, wherein the electrolyte solution is comprised of at least one electrolyte salt dissolved in an electrolyte solvent.

3. The method of in situ remediation of contaminated media of claim 2, wherein the electrolyte solution is comprised of at least one electrolyte salt selected from the group consisting of manganese sulfate, calcium nitrate, calcium chloride, sodium acetate, iron-EDTA, biocompatible surfactants, natural minerals, or anthropogenic sources.

4. The method of in situ remediation of contaminated media of claim 1, wherein the active material is comprised of at least one or more electrically conductive particles.

5. The method of in situ remediation of contaminated media of claim 4, wherein the one or more electrically conductive particles is selected from the group consisting of graphene, carbon black, activated carbon, biochar, carbon nanotubes, magnetite, hematite, conductive polymers, amorphous and mesoporous silica, titanium dioxide, aluminum oxide, metal oxides coated with conductive material, metal organic frameworks.

6. The method of in situ remediation of contaminated media of claim 5, wherein the contaminated media includes a plurality of naturally occurring microorganisms, and wherein the plurality of naturally occurring microorganisms are capable of forming a biofilm on a surface of one or more electrically conductive particles and wherein the conductive particles transfer a plurality of electrons between the first environment and the second environment by electric conduction.

7. The method of in situ remediation of contaminated media of claim 6, wherein the first environment comprises an anerobic zone and the second environment comprises an aerobic zone and wherein the plurality of electrons flow from the anerobic zone to the aerobic zone by electric conduction.

8. The method of in situ remediation of contaminated media of claim 7, further comprising converting the plurality of electrons into a plurality of reduced ions.

9. The method of in situ remediation of contaminated media of claim 8 wherein the plurality of reduced ions flow from the aerobic zone to the anerobic zone using ionic conduction.

10. The method of in situ remediation of contaminated media of claim 1, wherein the bioremediation composition further comprises a surfactant composition capable of increasing the dispersion of the one or more active materials into the bioremediation composition and increasing ionic conduction.

11. The method of in situ remediation of contaminated media of claim 1 further comprising:
   coupling an external electrical circuit between the first environment and the second environment; and
   applying an electrical current or an electrical load to the external electrical circuit.

12. The method of in situ remediation of contaminated media of claim 1 further comprising:
   coupling an external electrical circuit between the first environment and the second environment; and
   monitoring a bioelectrical current using the external electrical circuit; and
   evaluating a bioremediation rate.

13. The method of in situ remediation of contaminated media of claim 1 wherein the contaminated media comprises any of a soil, a sediment, a fill material, a groundwater, a surface water, and a waste water.

14. The method of in situ remediation of contaminated media of claim 1 further comprising:
   installing a first electrode in the first environment;
   installing a second electrode in the second environment;
   coupling an external electrical circuit between the first electrode and the second electrode; and
   monitoring a bioelectrical response using the external electrical circuit to evaluate a rate of bioremediation.

* * * * *